US008149783B2

(12) United States Patent
Dalsgaard et al.

(10) Patent No.: US 8,149,783 B2
(45) Date of Patent: Apr. 3, 2012

(54) PROVIDING MOBILITY CONTROL INFORMATION TO A COMMUNICATIONS DEVICE

(75) Inventors: Lars Dalsgaard, Oulu (FI); Antti Kangas, Oulunsalo (FI)

(73) Assignee: Nokia Corporation (FI)

( * ) Notice: Subject to any disclaimer, the term of this patent is extended or adjusted under 35 U.S.C. 154(b) by 705 days.

(21) Appl. No.: 10/998,226

(22) Filed: Nov. 29, 2004

(65) Prior Publication Data

US 2006/0068780 A1 Mar. 30, 2006

(30) Foreign Application Priority Data

Sep. 29, 2004 (FI) ................................. 20041266

(51) Int. Cl.
*H04W 4/00* (2009.01)
(52) U.S. Cl. ........ 370/331; 370/312; 370/328; 370/347; 455/436; 455/437; 455/438; 455/439; 455/440; 455/441; 455/442; 455/443; 455/444
(58) Field of Classification Search .......... 455/436–444; 370/310–350
See application file for complete search history.

(56) References Cited

U.S. PATENT DOCUMENTS

| | | | |
|---|---|---|---|
| 5,353,332 A | | 10/1994 | Raith et al. |
| 5,724,665 A | | 3/1998 | Abbasi et al. |
| 6,188,904 B1 * | | 2/2001 | Marsan ........................ 455/450 |
| 6,542,741 B2 * | | 4/2003 | Wallstedt et al. ............. 455/434 |
| 6,728,540 B1 * | | 4/2004 | DeSantis et al. .............. 455/437 |
| 7,181,204 B2 * | | 2/2007 | Alfano et al. ................. 455/423 |
| 2002/0191591 A1 * | | 12/2002 | Kivijarvi et al. .............. 370/352 |
| 2004/0092259 A1 * | | 5/2004 | Blanc et al. ................ 455/432.1 |
| 2006/0223532 A1 * | | 10/2006 | Liu et al. ...................... 455/436 |

FOREIGN PATENT DOCUMENTS

| | | |
|---|---|---|
| EP | 1 246 499 A1 | 10/2002 |
| WO | WO 99/01005 | 1/1999 |
| WO | WO 99/14974 A1 | 3/1999 |
| WO | WO 00/11900 | 3/2000 |
| WO | WO 01/03459 A1 | 1/2001 |
| WO | WO 02/07471 | 1/2002 |
| WO | WO 02/098073 A1 | 12/2002 |
| WO | WO 2004/066564 A1 | 8/2004 |

OTHER PUBLICATIONS

3GPP TS 03.22 V8.7.0 (Aug. 2002), pp. 11-12.
3GPP TS 45.008 V6.9.0 (Aug. 2004), pp. 52-75.
3GPP TS 44.018 V6.9.0 (Sep. 2004), pp. 150-178.
3GPP TS 44.060 V6.9.0 (Sep. 2004), pp. 26-42.
Supplementary European Search Report for Application No. EP 05 79 0895 dated Dec. 16, 2011.

* cited by examiner

*Primary Examiner* — Dwayne Bost
*Assistant Examiner* — Amancio Gonzalez
(74) *Attorney, Agent, or Firm* — Alston & Bird LLP

(57) ABSTRACT

A method for providing mobility control information to a communications device includes determining, for a transceiver device of a communication system, mobility control information of at least one further transceiver device and broadcasting system information from the transceiver device on a basic broadcast control channel, wherein the system information comprises the mobility control information of the at least one further transceiver device.

45 Claims, 10 Drawing Sheets

PROVIDING MOBILITY CONTROL INFORMATION TO A COMMUNICATIONS DEVICE

BACKGROUND OF THE INVENTION

1. Field of the Invention

The present information relating to providing information affecting mobility to a communications device. In particular, the present invention relates to providing from a transceiver device of a communication system mobility control information relating to neighbor transceiver devices of the communication system.

2. Description of the Related Art

A communication system can be seen as a facility that enables communication sessions between two or more entities such as user equipment and/or other nodes associated with the communication system. The communication may comprise, for example, communication of voice, data, multimedia and so on. Communication systems providing wireless communication for user equipment are known. An example of the wireless systems is a cellular communication system, such as the Global System for Mobile communications (GSM). Another example is the wireless local area network (WLAN).

Communication systems may provide both circuit-switched and packet-switched connectivity. As an example, the GSM system is circuit-switched, but packet-switched connectivity and information transfer can be provided therein by supporting General Packet Radio Service (GPRS). The support for GRPS may be provided, for example, by providing a set of specific GRPS support nodes in a GSM system. In the following the GSM/GPRS system is often used as an example of a communication system.

In a communication system transmission resources are typically arranged into channels. Channels may be common, shared or dedicated depending on whether they are used by all, some or one communications device communicating via a specific cell of the GSM system. Typically there are common control channels at least for providing basic system information about the cell, for setting up connections and for carrying out basic procedures in the GSM system, the basic procedures relating to, for example, mobility management. Typically all communications devices listen to at least one broadcast control channel providing system information.

A communications device communicating with a GSM system (or other communication system supporting mobility) typically needs information about the cell or cells it is currently using for communications and about the neighbor cells. When the quality or strength of the signals the communications devices receives from the communication system changes, the communications device may need to change the cell or cells it uses for communications. Information about the neighbor cells is needed in deciding which cell or cells to use. A communications device may determine and decide itself, which cell or cells to use (this concept is called autonomous mobility), or the communication system may order or instruct a communications device to use certain cell or cells. Change of cells may be called, for example, a cell reselection or a handover. Cell reselection in GSM system typically refers to the case where the communications device autonomously switches between the cells, based on the radio conditions (such as received signal level of serving and neighbour cells) and specific parameters set by the network. Handover in GSM system refers to the case where the network commands the communications device to switch the cell based on measurements results sent by the communications device, typically when there is a circuit-switched connection (such as a speech call) call ongoing.

In current mobility in GSM a communications device (mobile station MS) is required to have knowledge of its neighbor cells and their system parameters in order to be able to utilize those parameters in autonomous mobility. There are currently two approaches how the MS can obtain this information. A first approach is that the MS retrieves the neighbor cell parameters by listening to or communicating using common control channels (especially Broadcast Control Channel, BCCH) of the neighbor cells. A second approach is that the neighbor cell parameters are provided by the GSM network to MS either by sending this information directly to the MS (for example, in a Packet Measurement Order message or in a Packet Cell Change Order) or by scheduling it on a packet broadcast channel PBCCH which is read by the MS.

A mobile station in GSM/GPRS system has at least the following modes. A packet transfer mode, where the MS has one or more active packet data connections called a Temporary Block Flows (TBFs). A packet idle mode with continuous reception (Idle non-DRX), where the MS is prepared to quickly receive all scheduled downlink TBF establishments following to packet data transmission from the GSM/GPRS system to the mobile station. A packet idle mode with discontinuous reception (Idle DRX) where only paging blocks are received.

The first approach for the MS to obtain neighbor cell parameters, which is most common and where the MS autonomously reads the parameters from the signals sent by the neighbor cells according to specified rules, has at least one severe drawback. As the reading of the parameters is not limited to be performed in Idle DRX mode, the MS (when supporting GPRS) is also required to read the parameters while having an active TBF (Packet Transfer/Packet Switched connection) and while being in the Idle non-DRX mode. As the parameters to be read from the neighbor cells are physically transmitted on a different cell/frequency, the MS has to leave the current cell/frequency, tune to the new cell/frequency, in order to receive the actual information. This means that while the MS is receiving the information from the other cell/frequency, the information sent on the serving cell and meant for the MS, will be missed by the MS and the information lost. This information, which can be lost, may be normal data, information for data transmission permission scheduling (Uplink State Flag, USF), changes to current TBF configuration (if during TBF), and a paging message or establishment command for a new TBF (if during idle non-DRX).

A problem in the current situation in GSM/GRPS system is that due the MS may read neighbor cell system information parameters affecting change of cells, to be used in MS autonomous mobility at such time instances that the MS will/may at the same time loose valuable information sent to it.

This same problem also occurs within the provision of broadcast-nature information to several users, such as the Multimedia Broadcast/Multicast Service (MBMS). In this case, though, the problem is even worse as the data is supposed to be received by several mobile stations. The one-to-many (or point-to-multipoint) characteristics of the MBMS service where received data acknowledgments or data retransmissions may not always be used or are ineffective in terms of radio resource usage, together with unsynchronized (determined by individual mobile stations at arbitrary time instants depending on their timing and required information) interruptions in the data reception results in severe difficulties in the broadcast data provision and degraded user experience.

As the GSM/GPRS network is not aware of when the MS schedules the reading of the neighbor cell parameters and therefore the MS—each time MS acquires the required data—will miss the information/data sent from the GSM/GPRS network to the MS. The lost information is currently handled through re-transmission of the information, whenever applicable. In GPRS, this is only possible in Radio Link control (RLC) acknowledged mode, which may not be suitable for streaming/real-time type of Quality of Service (QoS) connections. In these cases where the other mode called RLC unacknowledged mode is used, data is lost during those periods where the MS acquires information from neighbor cells.

It is appreciated that although problems relating to GSM/GRPS and MBMS service are discussed in detail above, same difficulties may arise in other communication systems and in connection with other services. For example, the same problem identically applies to EGPRS systems, where the GSM system is provided with EDGE (Enhanced Data for GSM Evolution) support.

The aim of the present invention is to address at least some of the problems discussed above.

SUMMARY OF THE INVENTION

A first aspect of the present invention provides a method for providing mobility control information to a communications device, comprising
determining for a transceiver device of a communication system mobility control information of at least one further transceiver device, and broadcasting system information from said transceiver device on a basic broadcast control channel, wherein said system information comprises said mobility control information of at least one further transceiver device.

A second aspect of the present invention provides a method of operating a communications device, comprising
listening to system information on a basic broadcast control channel of at least one first transceiver device, said system information comprising mobility control information of at least one further transceiver device, and
updating mobility control information stored in the communications device in response to noticing a change in system information broadcast on the broadcast control channel of said at least first transceiver device.

A third aspect of the present invention provides a communications device comprising
means for listening to system information on a basic broadcast control channel in at least one first transceiver device, said system information comprising mobility control information of at least one further transceiver device, and
means for updating mobility control information stored in the communications device in response to noticing a change in system information broadcast on the broadcast control channel.

A fourth aspect of the present invention provides a communication system comprising
a plurality of transceiver devices for providing information transmission between the communication system and communications devices,
means for determining for a transceiver device of a communication system mobility control information of at least one further transceiver device, and
means for broadcasting system information from said transceiver device on a basic broadcast control channel, wherein said system information comprises said mobility control information of at least one further transceiver device.

A fifth aspect of the present invention provides a transceiver device for a communication system, said transceiver device comprising
means for determining mobility control information of at least one further transceiver device, and
means for broadcasting system information on a basic broadcast control channel, wherein said system information comprises said mobility control information of at least one further transceiver device.

A sixth aspect of the present invention provides a method for providing mobility control information to a communications device, comprising
receiving in at least one first transceiver device of a communication system from at least one communications device a request for mobility control information of at least one further transceiver device, and
sending, in response to said request, said mobility control information of at least one further transceiver device to said at least one communications device from at least one of said at least one first transceiver device.

A seventh aspect of the present invention provides a method of operating a communications device, comprising
communicating via at least one first transceiver device of a communication system, and
requesting mobility control information of at least one further transceiver device from at least one of said at least one transceiver device.

An eight aspect of the present invention provides a communications device comprising
means for communicating via at least one first transceiver device of a communication system, and
means for requesting mobility control information of at least one further transceiver device from at least one of said at least one first transceiver device.

A ninth aspect of the present invention provides a communication system comprising
a plurality of transceiver devices for providing information transmission between the communication system and communications devices,
means for receiving in a transceiver device from at least one communications device a request for mobility control information of at least one further transceiver device, and
means for sending, in response to said request, said mobility control information of at least one further transceiver device to said at least one communications device.

A tenth aspect of the present invention provides a transceiver device for a communication system, said transceiver device comprising
means for receiving from at least one communications device a request for mobility control information of at least one further transceiver device, and
means for sending, in response to said request, said mobility control information of at least one further transceiver device to said at least one communications device.

BRIEF DESCRIPTION OF THE DRAWINGS

Embodiments of the present invention will now be described by way of example only with reference to the accompanying drawings, in which.

DETAILED DESCRIPTION OF EMBODIMENTS OF THE INVENTION

In the following description, a cellular communication system is often used as an example of a communication system. The ideas are applicable, for example, in the following cellular communication systems: GSM/GRPS, GSM/EGRPS, and UMTS (Universal Mobile Telecommunications System). It is appreciated, however, that the ideas may be applicable also in other communication system, for example, in a Wireless Local Area Network (WLAN).

In the appended claims, reference is made to a transceiver device of a communication system. In a cellular communication system, a cell corresponds to the term transceiver device used in the claims. In a WLAN, for example, the term transceiver device corresponds to an access point. Furthermore, an active set relating to a communications device refers to that transceiver device or those transceiver devices of a communication system, via which the communications device communicates. The term active set is well-known in connection with cellular communication systems.

Figure 1:
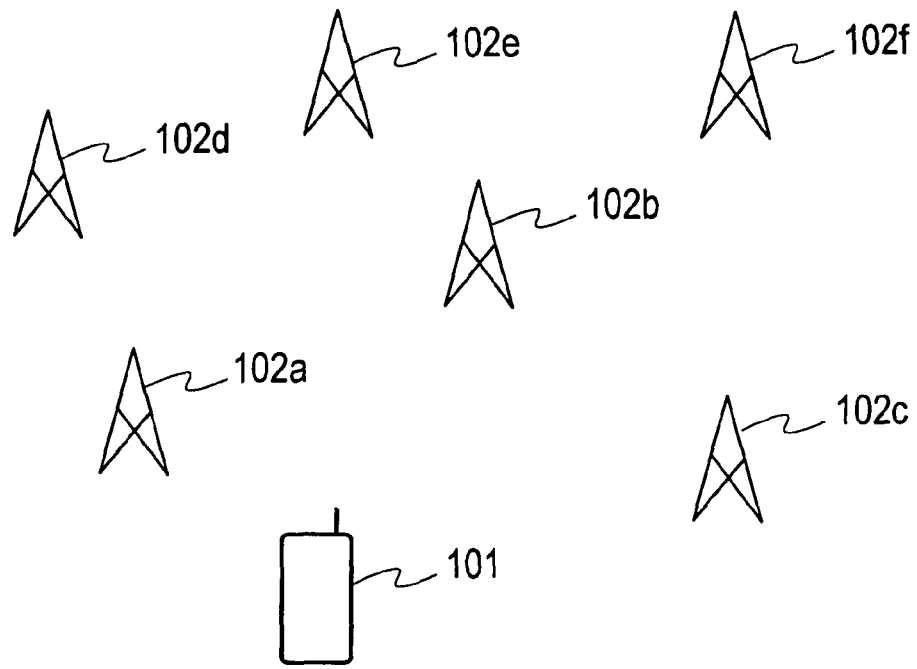
FIG. 1 shows schematically a communication system with which embodiments of the invention can be used.

FIG. 1 shows schematically a communication system with which embodiments of the invention can be used. The communication system contains a plurality of transceiver devices 102. Depending, for example, on the transmitter/receiver diversity in use, a communications device 101 may at a time listen to signals transmitted by one or more than one transceiver device 102 of the communication system. Similarly, one or more than one transceiver device 102 of the communication system may be used for receiving the signals transmitted by the communications device 101.

If the communication device 101 is communicating via the transceiver device 102b, it may need mobility control information of at least one of the neighbor transceiver devices 102a, 102c, 102d, 102e, and 102f. As discussed in connection with the prior art, typically each transceiver device 102 transmits (often broadcasts) system information relating to the respective transceiver device, and this system information usually contains mobility control information. The communications device 101 may thus retrieve system information relating to neighbor transceiver devices by listening to the signals transmitted by these devices 102a, 102c, 102d, 102e and/or 102f. If the communications device 101 should at the same time listen to the signals transmitted by the transceiver device 102b, at least some of the problems discussed in connection with related art may be encountered.

In this description mobility control information refers to information affecting which transceiver device(s) 102 a communications device 101 uses for communications. Mobility control information may be a set of parameters. As an example, parameters and calculation rules affecting cell selection and reselection in the GSM system can be found from the following specifications: 3GPP TS 03.22 chapter 3.6 and 3GPP TS 05.08/45.008.

In a first embodiment of the invention, mobility control information of at least one further transceiver device is broadcast on a basic broadcast control channel by a transceiver device 102 of the communication system. Typically this mobility control information of the further transceiver device(s) is broadcast in the same manner as system information is in general broadcast by a transceiver device 102. The further transceiver devices are typically transceiver devices neighbor to a given transceiver device, which broadcasts mobility control information of the further transceiver devices. The further transceiver devices need not be the nearest neighbors of the given transceiver device. The further transceiver devices can be those transceiver devices whose signals a communications device may be expected to receive at a sufficient power level, when it is communicating via the given transceiver device.

It is appreciated that the term basic broadcast control channel refers to a broadcast control channel present in every cell of a specific cellular communication system or to a channel broadcast by every transmitter of a given non-cellular communication system. A communications device 101 able to communicate with a communication system containing transceiver devices 102 is prepared to listen to this basic broadcast control channel when it enters the communication system and when it communicates via the communication system. In the GSM system, for example, the basic broadcast control channel is the BCCH.

It is appreciated that in the following description and in the appended claims reference is made to at least one first transceiver device. A first transceiver device is a transceiver device, via which a communications device communicates with the communications system. Typically this means that the communications device at least listens to the basic broadcast control channel of a first transceiver device, if possible, without interruptions. It is appreciated that a communications device communicating with a communications system via a first transceiver device does not mean that the communications device should continuously transmit signals to and receive signals from the first transceiver device.

For example, in a GSM system, a first transceiver device refers to a serving cell. It is possible that a communications device uses more than one transceiver device for communications. For example, in a UMTS system, at least one transceiver device refers to cells belonging to the active set of the communications device.

It is appreciated that, if there are many first transceiver devices relating to a communications device (for example, many cells belonging to the active set of the communications device), one of the first transceiver devices may broadcast mobility control information of another of the first transceiver devices.

In a second embodiment of the invention, the communications device communicates with the communication system via at least one first transceiver device. The communications device requests for mobility control information of at least one further transceiver device from at least one of the first transceiver device(s).

It is appreciated that these first and second embodiments of the invention may be combined. In other words, a transceiver device of the communication system may broadcast mobility control information of at least one further transceiver device, and also provide support for requesting mobility control information of at least one further transceiver device. Some examples are discussed below in connection with FIGS. 2 and 3. It is appreciated that in combination of the first and second embodiment, the communications device may request information about all or only some those further transceiver device(s), whose mobility control information the first transceiver device(s) transmits.

Figure 2A:
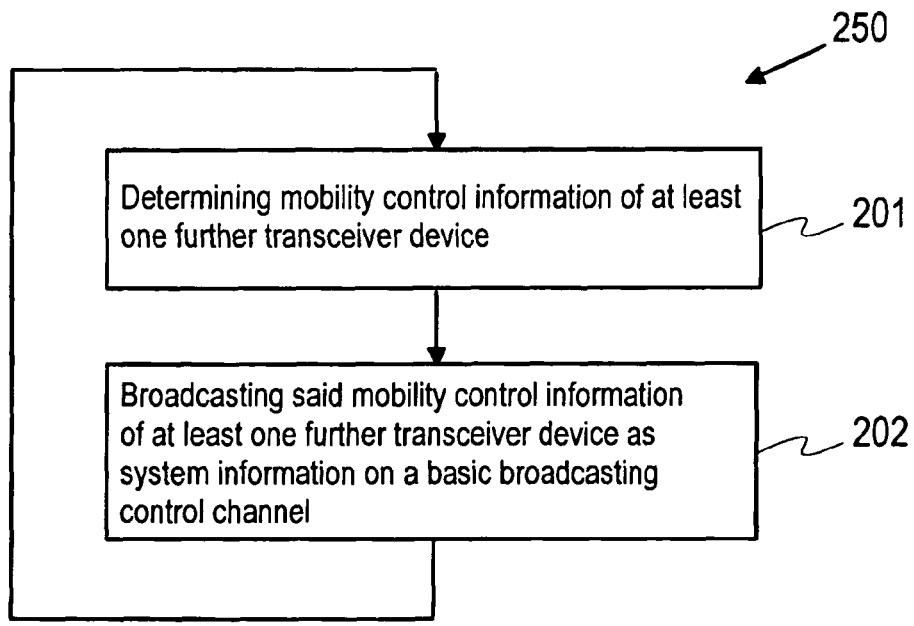
FIG. 2a shows a flowchart of a method in accordance with a first embodiment of the invention.

FIG. 2a shows a flowchart relating to a method 250 in accordance with the first embodiment. This method 250 is carried out by a communication system. In step 201, it is determined for a transceiver device of the communication system mobility control information of at least one further transceiver device. In step 202, system information is broadcast by the transceiver device on a basic broadcast control channel. The system information comprises the mobility control information of at least one further transceiver device.

The mobility control information of at least one further transceiver device may be provided as a system information message of a specific type. Furthermore, the specific system information message type may refer to same further transceiver devices as system information messages of at least one further type. In the description below, parameters in a GSM system and system information message types in a GSM system are discussed as an example.

Figure 2B:
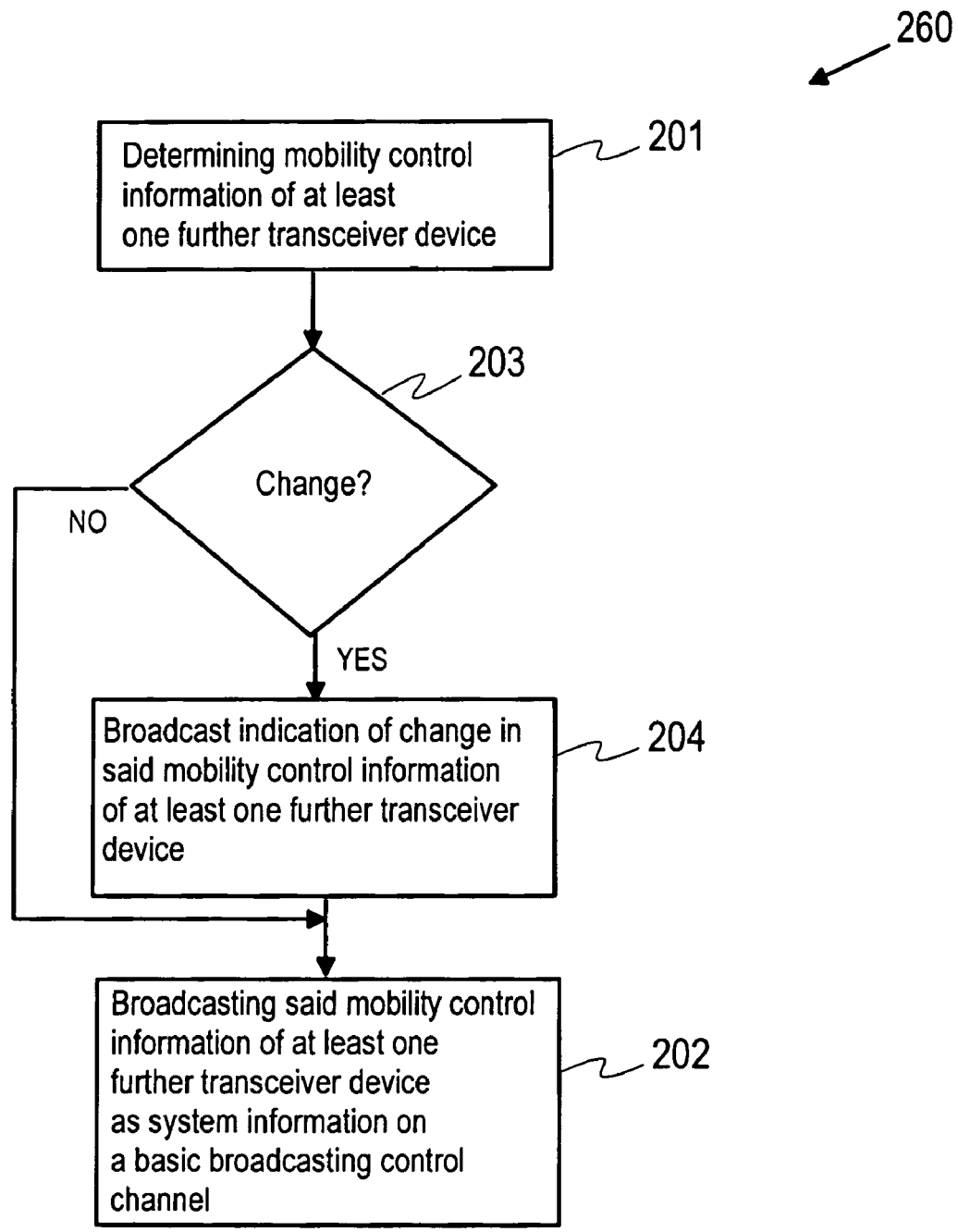
FIG. 2b shows a flowchart of a method in accordance with a variant of the first embodiment of the invention.

FIG. 2b shows a method 260 in accordance with a first variant of the first embodiment 5. Step 201 in the method 260 is similar to step 201 in the method 250. In step 203, it is checked whether the mobility control information of at least further transceiver device has been changed since it was broadcast latest. In addition to broadcasting system information containing mobility control information of at least one further transceiver device in step 202, indication of a change in the mobility control information of at least one further transceiver device is broadcast in step 204.

The indication of change in the mobility control information of at least one further transceiver device may be broadcast as part of system information on the basic broadcast control channel. The indication of change may refer to a change specifically in the mobility control information of at least one further transceiver device. Alternatively, the indication of change may refer in general to change in the system information broadcast by a transceiver device.

Broadcasting the indication of change in the mobility control information of at least one further transceiver device allows a communications device to update this mobility control information only when needed. The update may be performed by listening to system information of the broadcast channel or by requesting mobility control information of at least one further transceiver device from at least one first transceiver device. For more details, refer to FIG. 3c and to the relating discussion.

Figure 2C:
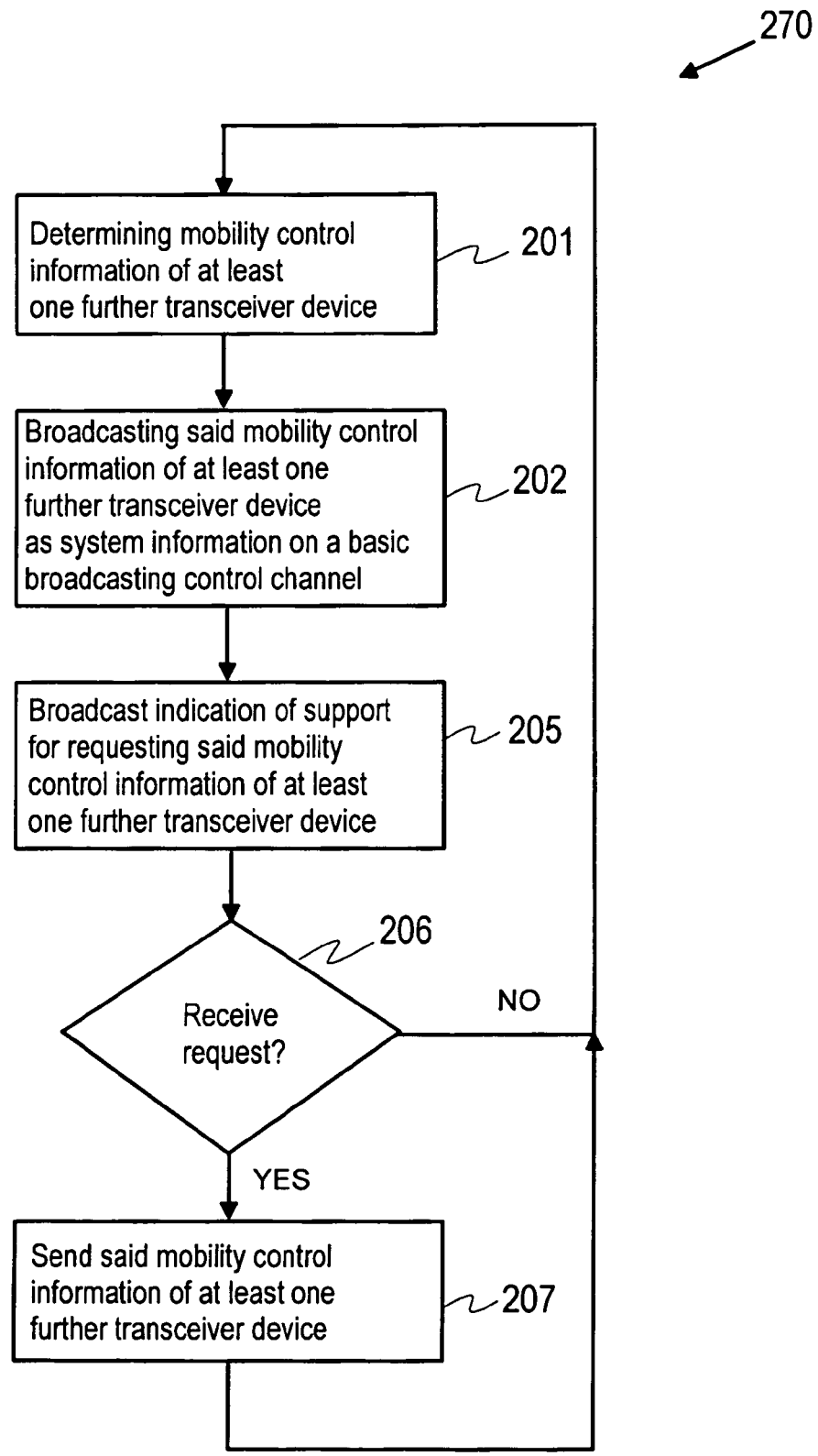
FIG. 2c shows a flowchart of a method in accordance with a combination of the first and second embodiments of the invention.

FIG. 2c shows a flowchart of a method 270, which combines features of the first embodiment and the second embodiment. In the method 270, mobility control information of at least one further transceiver device is determined in step 201, and the determined mobility control information is broadcast from a transceiver device of a communication system in step 202. In step 205, information indicating support for requesting this mobility control information of at least one further transceiver device is broadcast, typically as part of system information on the same basic broadcast control channel. In step 206, it is checked whether a request for this mobility control information of at least one further transceiver device is received. If a request has been received, in step 207 mobility control information of at least one further transceiver device is sent to at least one communications device. Different ways of requesting and sending mobility control information of at least one further transceiver device are discussed in more detail below. It is possible to request mobility control information of specific further transceiver devices or mobility control information of all further transceiver devices. It is also possible to send mobility control information of specific further transceiver devices or all available mobility control information of further transceiver devices.

It is appreciated that in the method 270 it is further possible to broadcast an indication of change in the mobility control information of at least one further transceiver device. A communications device may send the request received in step 206 in response to noticing said change or spontaneously.

Figure 2D:
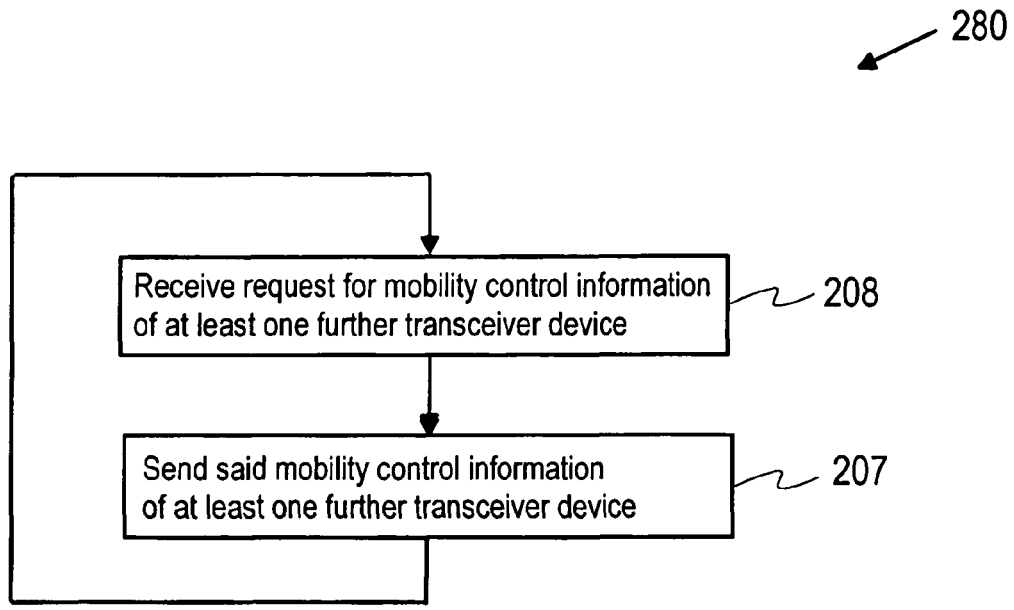
FIG. 2d shows a flowchart of a method in accordance with the second embodiment of the invention.

FIG. 2d shows a flowchart of a method 280 relating to the second embodiment. In step 208 a request for mobility control information of at least one further transceiver device is received. In step 207, mobility control information of at least one further transceiver device is sent to at least one communications device. It is appreciated that in the method 280 according to this second embodiment, support for requesting mobility control information of at least one further transceiver device may be broadcast similarly as in step 205 of the method 270. A communications device may be configured to request mobility control information of at least one further transceiver device only when the communication system indicates support for this feature.

Similarly as in the first embodiment, in this second embodiment the mobility control information of at least one further transceiver device may be provided as a system information message of a specific type. The specific system information message type may refer to same further transceiver devices as system information messages of at least one further type.

The request for mobility control information of at least one further transceiver device in step 208 and the response in step 207 may be messages of a procedure for requesting system information. Examples of such procedures are discussed in more detail below.

Similarly as the method 270, a method in accordance with the second embodiment may contain step 205, where indication of support for requesting mobility control information of at least one further transceiver device is broadcast. The indication of support may be broadcast as part of system information.

Figure 3A:
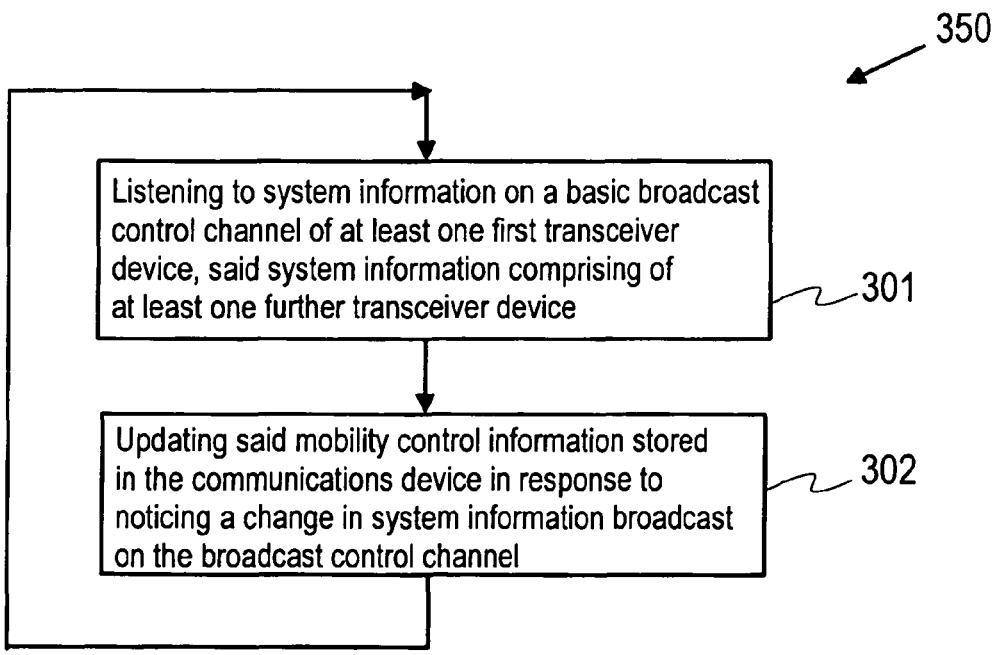
FIG. 3a shows a flowchart of a method of operating a communications device in accordance with the first embodiment of the invention.

FIG. 3a show a flowchart relating to a method 350 of operating a communications device in accordance with the first embodiment. In step 301, the communications device listens to system information on a basic broadcast control channel in at least one first transceiver device. This system contains mobility control information of at least one further transceiver device. In step 302, the mobility control information stored in the communications device is updated in response to noticing a change in system information broadcast on the broadcast control channel. The updated information may be determined based on system information broadcast on the basic system information channel or, if the communications device supports also the second embodiment, by requesting and receiving the mobility control information.

As discussed above, an indication of change in the mobility control information of at least one further transceiver device may be broadcast on the basic broadcast control channel. This enables the mobile station to update the mobility control information of at least one further transceiver device only in response to noticing the change in the mobility control information of at least one further transceiver device. In this way, there is no need for the communications device to retrieve mobility control information periodically from further transceiver devices.

It is appreciated that in this description and in the appended claims the term retrieve (from a further transceiver device) refers to a communications device tuning to a transmit frequency of a further transceiver device and then obtaining information from the signals sent by the further transceiver device. In the appended claims the term receive refers to receiving information from those transceiver devices via which the communications device is currently communicating (that is, for example, from the serving cell in the GSM system and from a cell belonging to the active set in the UMTS system).

Figure 3B:
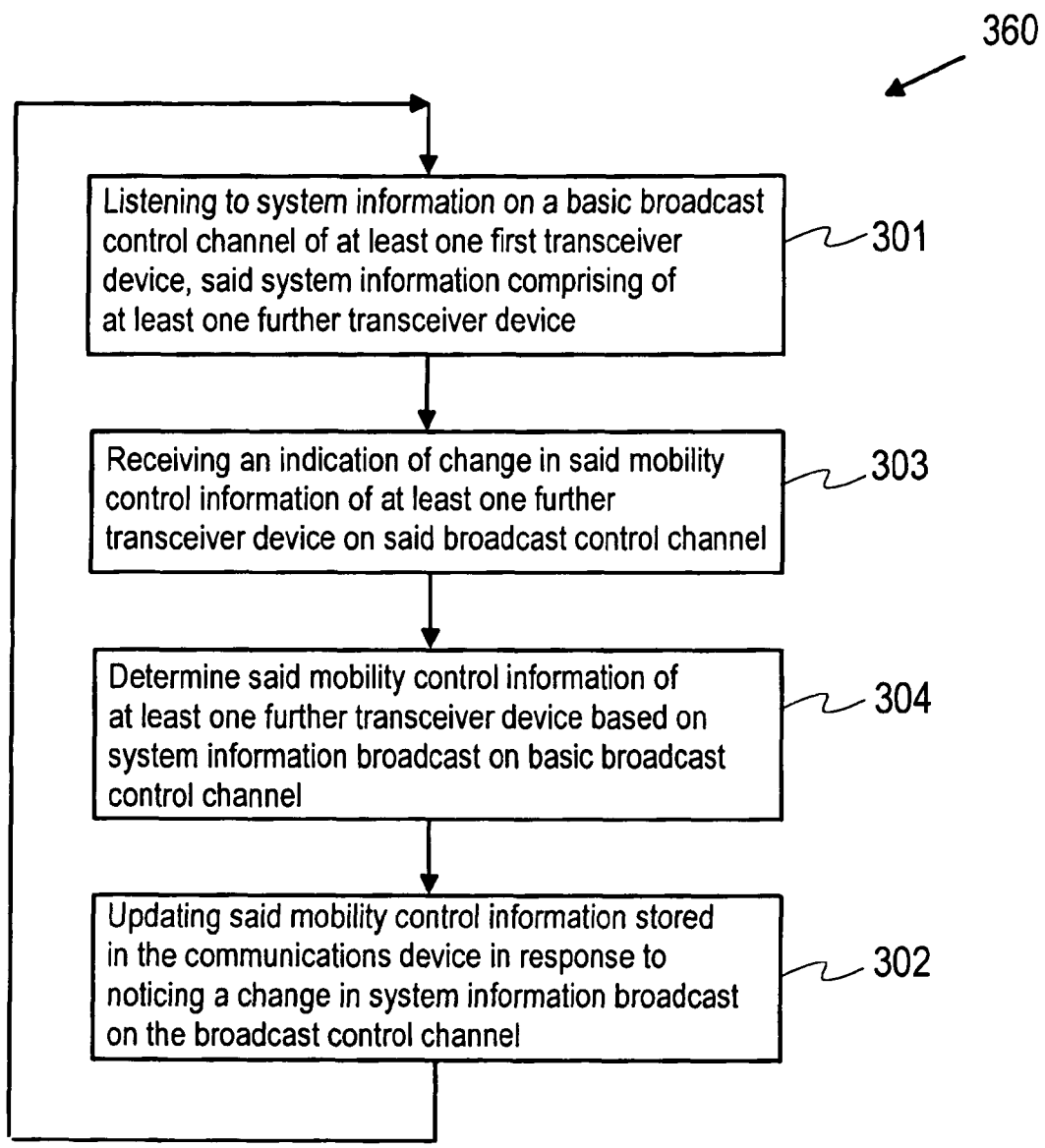
FIG. 3b shows a flowchart of a method of operating a communications device in accordance with a variant of the first embodiment of the invention.

FIG. 3b shows a flowchart of a method 360 in accordance with a variant of the first embodiment. In the method 360, the mobility control information is determined based on system information broadcast on the basic broadcast control channel in step 304. Step 304 is carried out in response to receiving an indication of change in the mobility control information of at least one further transceiver device in step 303.

Figure 3C:
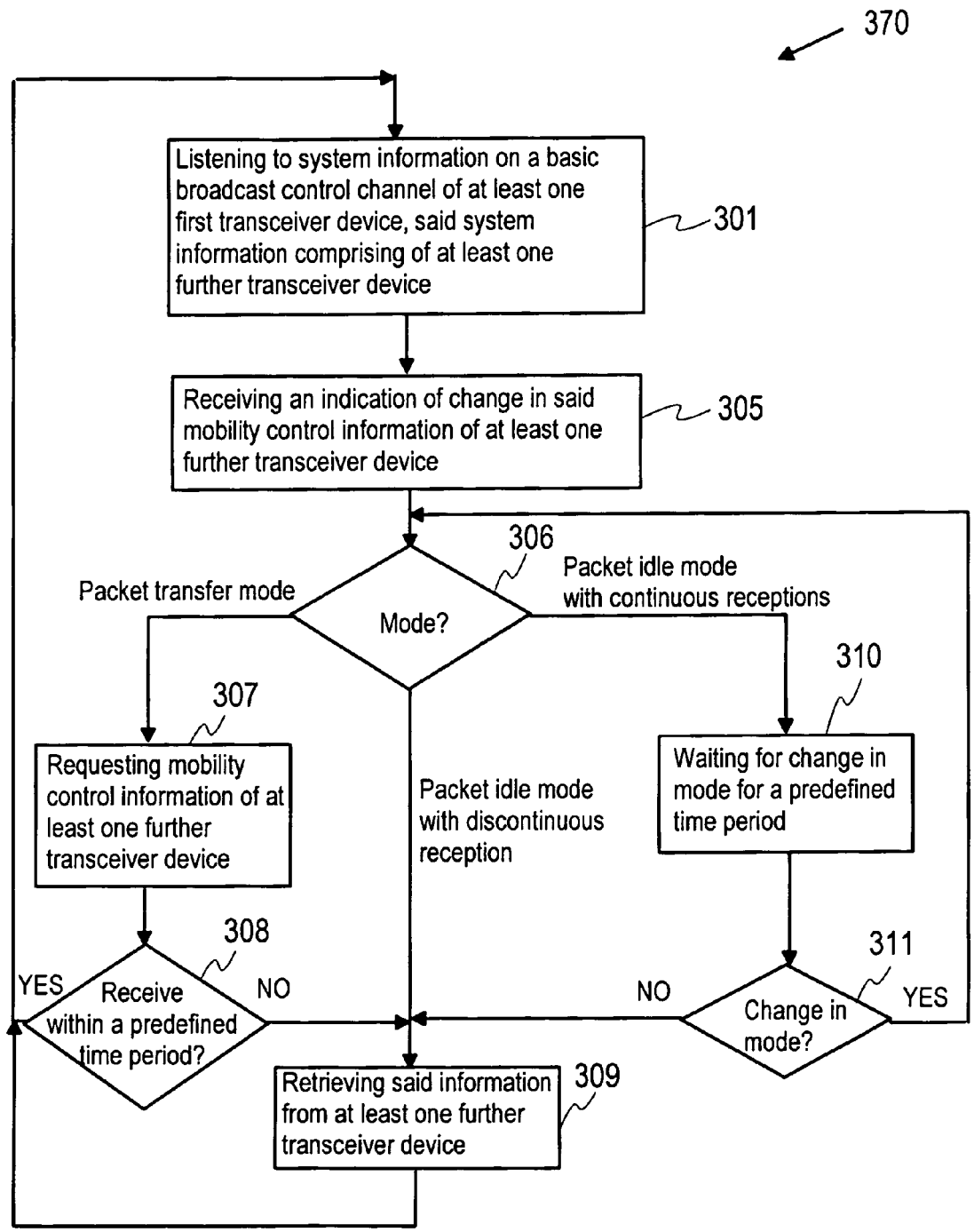
FIG. 3c shows a flowchart of a method of operating a communications device in accordance with a variance of the second embodiment of the invention.

FIG. 3c shows a flowchart of a method 370 in accordance with a first variance of the second embodiment. It is appreciated that in this method 370 it is not necessary that mobility control information of at least one further transceiver device is broadcast on the basic broadcast control channel or otherwise. An indication of change in the mobility control information is, however, provided to the communications device (step 305 in FIG. 3c). This indication may be provided on a broadcast channel or otherwise.

The method 370 relates to a communications device having at least three packet data modes: a packet transfer mode, a packet idle mode with continuous reception, and a packet idle mode with discontinuous reception. After step 301, in step 305, an indication of change in the mobility control information of at least one further transceiver device is received. The functionality to update the mobility control information depends in the method 370 on the packet data mode of the communications device (step 306). If the communications device is in a packet transfer mode, it requests the mobility control information of at least one further transceiver device in step 307. If the requested information is received within a predefined time period (step 308), the mobility control information is updated and the method 370 continues in step 301. If the request information is not received within the predefined time period, the communications device retrieves the mobility control information of at least one further transceiver device from at least one further transceiver device in step 309. Functionality in this step 309 is thus in accordance with the known methods for obtaining mobility control information from further transceiver devices. Thereafter the method 370 continues from step 301.

If the communications device is in a packet idle mode with discontinuous reception, it can retrieve the mobility control information from at least one further transceiver device in step 309. If the communications device is in a packet idle mode with continuous reception, it waits for a change in mode for a predefined period of time in step 310. If a change in mode occurs within the predefined period of time, the method 370 continues in step 306. If there is no change in the mode, the communications device retrieves mobility control information from at least one further transceiver device in step 309.

Figure 3D:
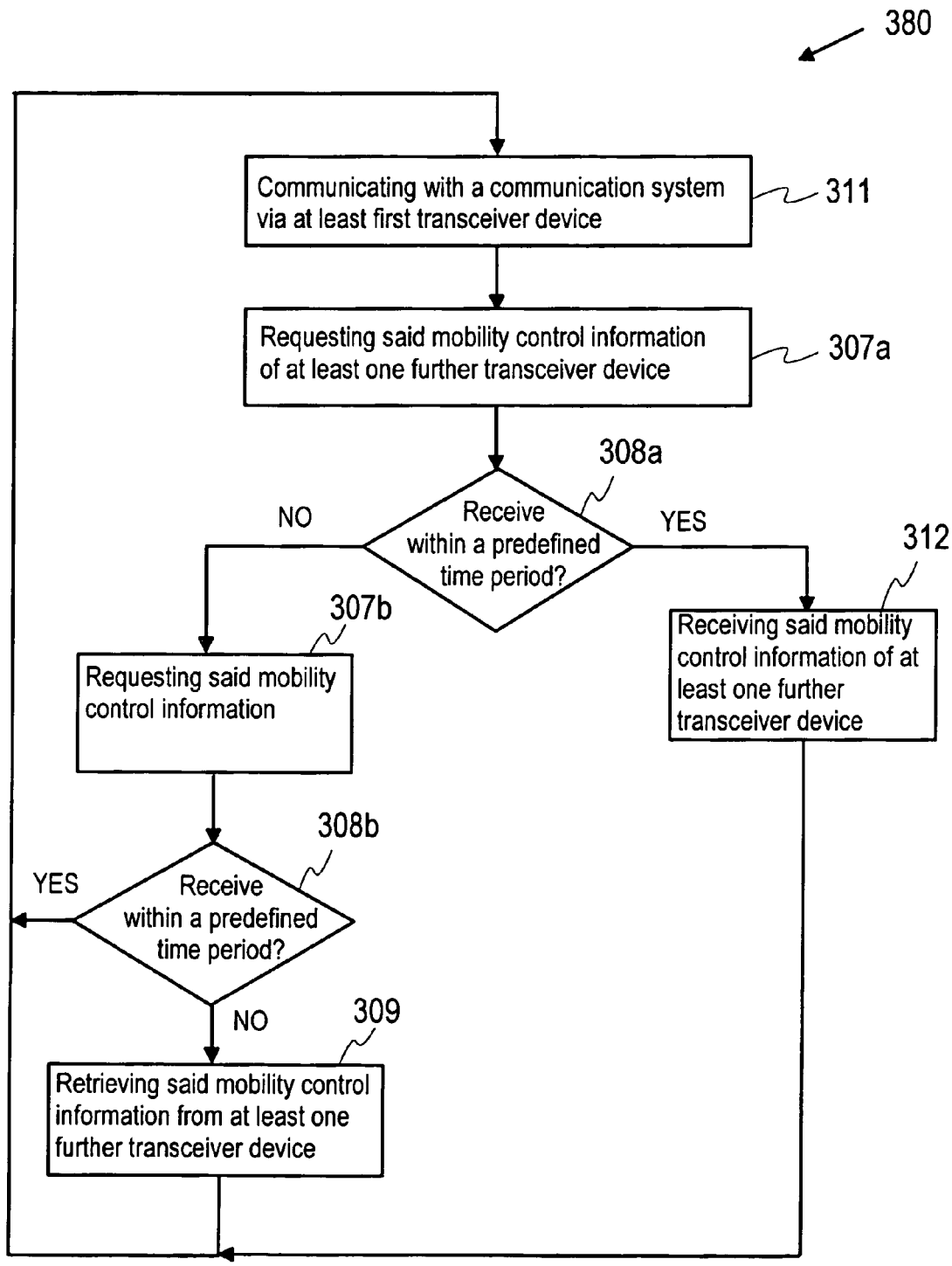
FIG. 3d shows a flowchart of a method of operating a communications device in accordance with a further variant of the second embodiment of the invention.

FIG. 3d shows a flowchart of a method 380 in accordance with a further variation of the second embodiment. In step 311 (and during at least most of the method 380), the communications device communicates via a first transceiver device. In step 307a, the communications device requests mobility control information of at least one further transceiver device from at least one first transceiver device. To ensure that mobility control information of at least one further transceiver device will be updated, the communications device may set a timer. In step 308a, it may be checked that mobility control information of at least one further transceiver device is received from at least one first transceiver device within a predefined period of time. The mobility control information of at least one further transceiver device may be received in step 313, and thereafter the method 380 continues in step 311. If the requested mobility control information of at least one further transceiver device is not received before the timer expires, it may be requested for a second time in step 307b. It the requested mobility control information is received this time from at least one of the first transceiver devices, the method 380 continues in step 311. Alternatively, the communications device may retrieve mobility control information from at least one further transceiver device in step 309, and thereafter the method 380 continues in step 311.

It is appreciated that a communications device may be operated also in accordance with a combination of the first and second embodiments of the invention. In this case, the communications device may obtain the mobility control information by listening to the system information broadcast on the basic broadcast control channel (see, for example, FIG. 3a) or by requesting as, for example, in FIG. 3d.

It is appreciated that the method discussed in connection with FIGS. 2 and 3 are only exemplary. The details may vary and, for example, the order of the steps may change.

It is appreciated that a communication system, transceiver device and/or communications device in accordance with the first embodiment and/or the second embodiment may be obtained by updating software (program codes) of existing systems and devices.

In the following, further variations of the embodiments of the invention are discussed in more detail with reference to the GSM/GPRS system.

As an example of the mobility control information of a transceiver device (cell), this information contains the following parameters the GSM system:
  Cell barring indication (cell_bar_access)
  Exclusive access indication (exc_ass)
  Information about routing area (Same_ra_as_serving_cell)
  Parameters used in mobility procedure (C-value calculation and reselection algorithm):
    Rxlev_access_min
    Ms_txpwr_max_cch
    Power_offset
    Cell_reselect_offset
    Temporary_offset
    Penalty_time A first detailed variation of the second embodiment (requesting and sending mobility control information) is to utilize current procedure and messaging and enhance these to include the possibility of providing neighbour cell parameters affecting mobility. Using the Packet SI Status procedure and messages (Packet SI Status message, Packet Serving Cell Data and Packet Serving Cell SI) as already specified in 3GPP TS 44.060 chapter 5.5.1.4.3, together with possibly one new message can do this. The new message to be specified is to contain the actual neighbour cell parameters affecting cell reselection as listed above.

An existing system information message may be used, or a new system information message may be composed, to be used for delivering neighbour cell parameters affecting cell reselection from the network to the MS. This message could be used either as a broadcast message (that is, in variants of the first embodiment) or only in connection with Packet SI Status procedure (that is, in variants of the second embodiments) or both. The new system information message could be called System Information Type 2n and contain the parameters listed above. It may also be possible to re-use the existing system information message type 10 by redefining its restrictions and usage (as specified in 3GPP TS 44.018 section 9.1.50). Next there are two approaches on how this system information can be delivered to the MS:

1) The message is broadcast on BCCH (or Ext BCCH), similarly as in the first embodiment. It may be understood as an extension of the existing SI2-family and the parameters included in the message refers to the cells received in the other SI2 messages. If not all are received during normal reselection the Packet SI Status message is improved to include indication for this (new) message as well. This improved Packet SI Status message corresponds to the request for mobility control information in the second embodiment. Hereafter the network may send the SI2n/SI10 to the MS in Packet Serving Cell Data or Packet Serving Cell SI messages.
2) The message is not broadcast on BCCH (or Ext BCCH), but is only available through the Packet SI Status procedure, similarly as in the second embodiment. The presence of the SI2n/SI10 is not indicated anywhere, but the MS supporting the SI2n/SI10 can indicate in the Packet SI Status message that these messages are missing. The network can then send the SI2n/SI10 messages to the MS's supporting the SI2n/SI10 using the Packet Serving Cell Data or Packet Serving Cell SI messages.

A release independent solution of proposal 2 above: When the MS notices that the network supports this procedure the MS indicates the SI2n/SI10 as missing. Networks supporting SI2n/SI10 will then provide the information, while networks that do not support SI2n/SI10 just ignore the indication.

Details on the coding of the messages and procedures will be in next section.

A further variation of the second embodiment is to compose a new procedure called Packet NSI (Neighbor System Information) Status procedure. This procedure includes two new messages:

1) Packet NSI Status message
2) Packet NSI Information Data message

The network support of this procedure needs to be indicated in the broadcast information in order to let the MS know that it can utilize the procedure. Besides this the procedure needs to be protected by timers in order to ensure that the MS will start autonomous reading (retrieval) of neighbour cell information according to existing procedures in case of no/insufficient answer from network or other failures to the procedure.

The Packet NSI Status procedure will be somehow similar to the existing Packet SI Status procedure. When the MS notice that the network supports the Packet NSI Status procedure it shall be used when possible. The support from network side is indicated in broadcast system information (e.g. SI13). When allowed the MS sends the Packet NSI Status message indicating a list of neighbour cells from which cell reselection parameters, as listed above, are needed. When the network receives the Packet NSI Status message from the MS, it will possibly schedule a number of Packet NSI Information Data messages in order to provide the MS with the information.

As further variants of the second embodiment of the invention in both its forms (that is, using Packet SI Status procedure or Packet NSI Status procedure) mentioned above, the new message, whether it is exemplified by SI2n message or Packet NSI Information Data message, may also be used as distribution messages, send on PACCH during TBF. The characteristics of the distribution message are that in this kind of message, the neighbour cells need to be unambiguously indicated in order to be correctly decoded and applied by all the receivers of such distribution messages. This means that the ARFCN+BSIC (Absolute Radio Frequency Carrier Number and Base Station Identity Code) information needs to be incorporated for each neighbour cell. This information identifying the cells may be as optimally coded as possible in order to reduce the amount of separate messages required to provide the information.

For MBMS, the possible lack of uplink channel for sending the proposed PACKET NSI STATUS message, the solution would be to use whatever uplink feedback messages are envisioned for MBMS (e.g. PACKET DOWNLINK ACK/NACK or a new message, whichever solution will be adopted by 3GPP TSG GERAN). In this case, the request/indication of missing neighbour cell data parameters are indicated as part of the uplink feedback message (as separate information element). For this information, several alternative approaches may be taken for the granularity of the request (depending on available space in the used message(s) and/or as optimal for the envisioned need for the different scenarios):

1) only indicate that information is missing; this would make the network to send the information for all neighbour cells. In case the encoding in the "PACKET NSI INFORMATION DATA" message is efficient, this may feasible. The benefit here is that if distribution message approach is used here, all mobiles requiring information on any of the neighbour cells would be satisfied as information on all cells are provided. Also, this would make the network implementation easy. This could be the solution for MBMS.
2) indicate specifically for which cell(s) the information is missing. This would reduce the DL messaging from the network as only requested information is provided. However, this approach may introduce a lot of signalling (in MBMS case, considering request from several mobiles requesting different information) and thus not be feasible for MBMS. For the stand-alone packet transfer mode, this approach seems to be the best one. NOTE: this approach should be such that the MS is required to request the information for all neighbour cells, not only for the 6 strongest. This is because otherwise change of radio conditions would trigger the need for further signalling, which may not be desirable from the system operation point of view.
3) something in between. For example, the MS could identify what it needs, and the network may answer with a wider distribution of information, based on the aggregate request (that the network has received from several individual mobile stations tuned to the downlink channel in which the information can be sent). This approach makes the network implementation more complex, but might be optimal from the radio resource utilization point of view.

As an additional requirement to these two concepts (that is, use of the Packet SI Status procedure or Packet NSI Status procedure), it is proposed also to introduce a possibility for the network to enforce a mandatory refresh or re-acquisition of the neighbour cell system information affecting cell reselection (as provided in the proposed procedures above) or any neighbour cell system information data. This can be implemented by making use of the already existing Change Mark procedure in SI13 or PSI13. Here a new value in the SI_CHANGE_FIELD could be used for indicating to the MS that a re-acquisition of the neighbour cell data is required. The MS would have e.g. 5 minutes to perform refresh of the information (comparable to today's validity of neighbour system information). If the network supports the Packet NSI Status procedure, the indication of the enforced re-acquisition of neighbour cell system information data, could be followed by usage of the Packet NSI Information Data message as a distribution message over the air interface. These two procedures should be able to work side by side, by stating in the specification, that if the Packet NSI Status procedure is supported by network, the MS shall use this procedure over the traditional Packet SI Status procedure for acquiring neighbour cell data.

In both variants (that is, using the Packet SI status procedure and using the Packet NSI status procedure), it may also need to be specified that the MS shall not attempt to fetch the required information during packet transfer mode (or MBMS reception) while the abovementioned procedures are used. Of course, on the other hand, a time limitation for attempting the acquisition with the above-mentioned procedures typically needs to be set. This time requirement could be adjusted tied to a timer. As long as the timer is running the network has time to start to neighbour cell system information (by e.g. using the Packet NSI Information Data message or using Packet Serving Cell Data or Packet Serving Cell SI) to the MS. If the timer times out and the network have not yet started to send the information the MS will autonomously read the information.

The release independent proposal described above can be used for introducing the feature in an early phase of the specification (although not so efficient). The second form of the second embodiment (that is, using Packet NSI Status procedure) can then be used for improving the feature in a later release assuring more optimal behaviour.

In the following a possible implementation is described in details. Mostly this will cover the new messages and changes to existing messages (or description of them). Procedures will be explained with reference to the attached FIGS. 4 to 6.

First implementation proposal will concentrate on the possibility to re-use the existing Packet SI Status procedure together with a new System Information Type 2n message. In this explanation the usage of existing SI10 is also possible. It means that the idea is the same whether using the new SI message or using the existing.

This method will make use of the already existing Packet SI Status procedure for making it possible for the MS to request from the network neighbour cell parameters affecting cell reselection. This description will be based on the assumption that the new System Information Type 2n message is not broadcast on BCCH in the serving cell, but available only through Packet SI Status procedure.

The necessary change to the Packet SI Status message is in the textual part in the Packet SI Status information element details. Here shall be added the possibility to indicate SI2n in either the Received SI Message List or the Received Unknown SI Message List.

The new System Information Type 2n message needed for delivering the neighbour cell information affecting cell reselection could be build as follows (using the needed parameters as indicated above):

System Information Type 2n Message Content

| IEI | Information element | Type/Reference | Presence | Format | length |
|---|---|---|---|---|---|
| | L2 Pseudo Length | L2 Pseudo Length 10.5.2.19 | M | V | 1 |
| | RR management Protocol Discriminator | Protocol Discriminator 10.2 | M | V | ½ |
| | Skip Indicator | Skip Indicator 10.3.1 | M | V | ½ |
| | System Information Type 2n Message Type | Message Type 10.4 | M | V | 1 |
| | SI 2n Rest Octets | SI 2n Rest Octets 10.5.2.xx | M | V | 20 |

Where the message type definition is given according to 44.018.

The SI2n Rest Octets may be coded as follows (just a proposal):

< SI2n_INDEX : bit (4) >
< SI2n_COUNT : bit (4) >
< Neighbour Cell Reselection parameters : { 1 < Neighbour Cell Reselection params struct 1> } ** 0 >
< Neighbour Cell Reselection params struct 1 > ::=
    < START_FREQUENCY : bit (10) >
    < CCCH Cell Reselection params : < Cell Selection struct > >
    < NR_OF_REMAINING_CELLS : bit (4) >
    < FREQ_DIFF_LENGTH : bit (3) >
    {    < FREQUENCY_DIFF : bit (1 + val(FREQ_DIFF_LENGTH)) >
         < CCCH Cell Reselection Params :
         <CCCH Cell Reselection struct>> } *
(val(NR_OF_REMAINING_CELLS)) ;
    < CCCH Cell Reselection struct > ::=
    < BSIC : bit (6) >
    < CELL_BAR_ACCESS : bit >
    < EXC_ACC : bit >
    < SAME_RA_AS_SERVING_CELL : bit (1) >
    { 0 | 1    < RXLEV_ACCESS_MIN : bit (6) >
               < MS_TXPWR_MAX_CCH : bit (5) > }
    { 0 | 1    < POWER_OFFSET : bit (2) > }
    { 0 | 1    < TEMPORARY_OFFSET : bit (3) >
               < PENALTY_TIME : bit (5) > }
    { 0 | 1    < RESELECT_OFFSET : bit (5) > }

The procedure would as such be very similar to the Packet SI Status (as this is basically an extension of that procedure). If the network and MS supports the Packet SI Status procedure, the MS will when possible send the Packet SI Status to the network indicating according to existing rules, that SI2n has not been received. The MS starts the appropriate timers according to existing procedure. The network may then schedule the sending of the SI2n message in the Packet Serving Cell Data message or Packet Serving Cell SI message. The scheduling of the SI2n messages from network side is then done in the case that the network supports this message. Otherwise they will not be scheduled and the MS will register the SI2n as not been received. The MS will in this case autonomously retrieve the neighbour cell system information parameters affecting the cell reselection from the neighbour cells as specified already.

Figure 4:
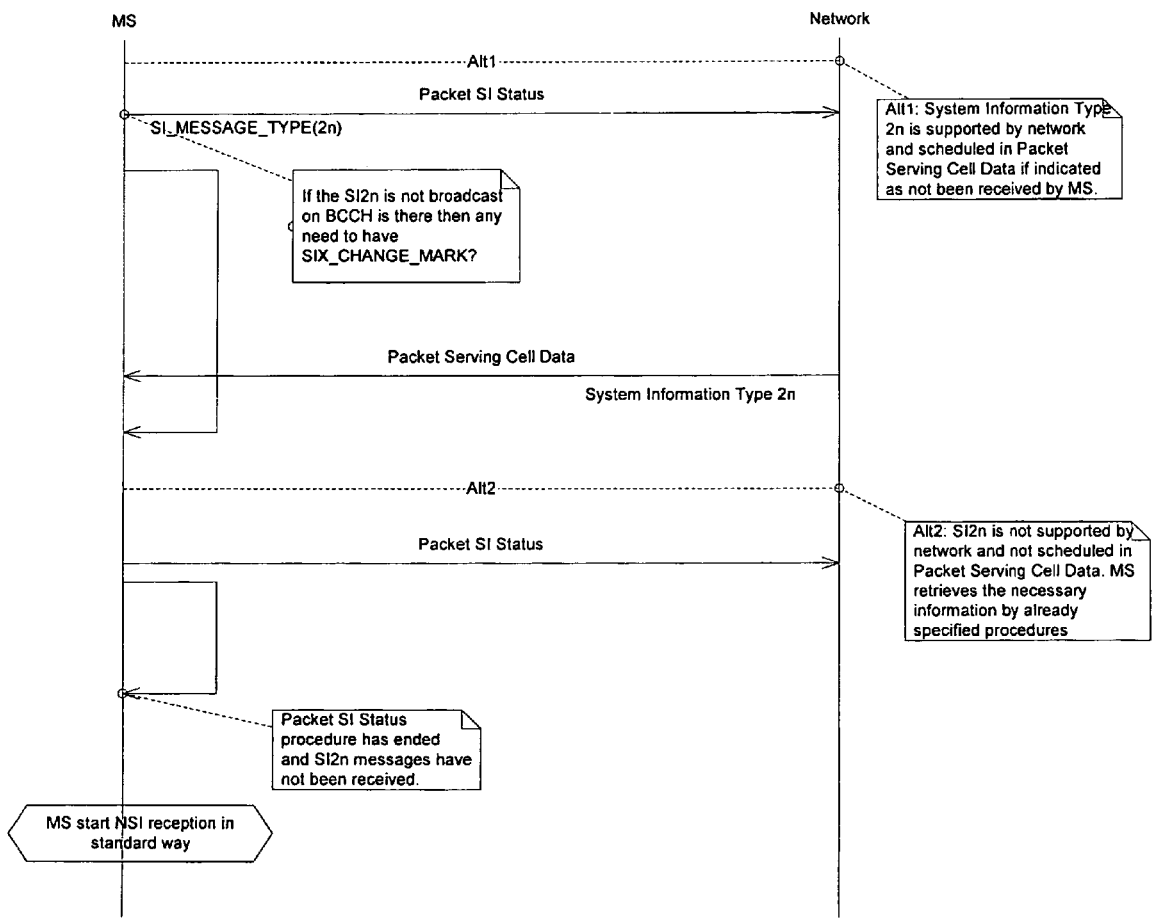
FIG. 4 shows one detailed variant of method in accordance of the second embodiment or in accordance with a combination of the first and second embodiments.

The procedure is illustrated in FIG. 4.

The concept can easily be widened to allow the System Information Type 2n to be broadcast on the BCCH (or Ext BCCH), in accordance with the first embodiment discussed above. This will not change the main concept and idea in the above procedure. The main difference will be the scheduling of the SI2n on BCCH and the usage of change mark together with this message (as is done with other messages on BCCH).

The second implementation proposal concentrates on the definition of two new messages as well as defining the new procedure for using them.

The method may as mentioned introduce two new messages: Packet NSI Status message (MS to network direction) and the Packet NSI Information Data message (Network to MS direction). The principle in the messages is that the Packet NSI Status message will contain a list of carriers (identified by ARFCN and BSIC or explicit references to GSM Neighbour Cell list indices) used in the current cells neighbour list, to indicate to the network the neighbour cells from which the parameters affecting cell reselection are missing. The network replies to this message using the Packet NSI Information Data message. This message is used for delivering the neighbour cell parameters affecting cell reselection and uses (or may use) the list of carriers from the Packet NSI Status message as reference. This is explained in details in the following in the detailed description of the messages:

The Packet NSI Status may be coded in the following way:
Packet NSI Status Information Elements

```
< Packet NSI Status message content > ::=
    < GLOBAL_TFI : < Global TFI IE > >
    < Message_ID : bit (2) >
    < Requested Neighbour ARFCN List : < ARFCN List struct 1 > >
    < padding bits > ;
< ARFCN List struct 1 > ::=
    < START_FREQUENCY : bit (10) >
    < BSIC : bit (6) >
    < NR_OF_REMAINING_CELLS : bit (4) >
    < FREQ_DIFF_LENGTH : bit (3) >
    {   < FREQUENCY_DIFF : bit (1 + val(FREQ_DIFF_LENGTH)) >
        < BSIC : bit (6)> } * (val(NR_OF_REMAINING_CELLS)) ;
```

The rules for sending this message will be the same as for sending the Packet SI Status message. The message can be sent during TBF for retrieving the neighbour cells parameters affecting cell reselection, and can only be sent if the network supports the procedure.

In the situation where the MS is involved in data reception, but cannot send this message on the uplink to the network due to e.g. MBMS reception, a variant of this message could be used. As a variant the MS could include information into the Packet Downlink Ack/Nack message indicating, using e.g. a bitmap, for which neighbours in the current neighour list, the MS is missing neighbour cell parameters affecting cell reselection (see also the discussion of information granularity below).

The reply from the network (Packet NSI Information Data message) to this message could look as follows:
Packet NSI Information Data Information Elements

```
< Message_ID : bit (2) >
< NSI_INFO_INDEX : bit (3) >
< NSI_INFO_COUNT : bit (3) >
< Neighbour Cell Reselection parameters : { 1 < Neighbour Cell
Reselection params struct 2 > } ** 0 >
< Neighbour Cell Reselection params struct 2 > ::=
    { 0 | 1    < START_NLIST_INDEX : bit (4) > }
    < CCCH Cell Reselection Params : <CCCH Cell Reselection struct>> }
< CCCH Cell Reselection struct > ::=
    < CELL_BAR_ACCESS : bit >
    < EXC_ACC : bit >
    < SAME_RA_AS_SERVING_CELL : bit (1) >
    { 0 | 1    < RXLEV_ACCESS_MIN : bit (6) >
               < MS_TXPWR_MAX_CCH : bit (5) > }
    { 0 | 1    < POWER_OFFSET : bit (2) > }
    { 0 | 1    < TEMPORARY_OFFSET : bit (3) >
               < PENALTY_TIME : bit (5) > }
    { 0 | 1    < RESELECT_OFFSET : bit (5) > }
```

The Packet NSI Information Data message could also be a distribution message. In this case it needs to be assured in the specification how the network references the neighbour list so that is will be similar for all mobiles. This could be done by the addition of specific ARFCN+BSIC entry or by explicit referral to the GSM Neighbour Cell list index for one or more cells included in the message. This is not shown in above message.

The different fields in the message (the Packet NSI Information Data Information Elements) are described in more details next:

1) Message_ID: This is a message ID and is used by the MS to ensure that the reply from the network matches the request. The value of the Message_ID shall match the value sent to the network in the Packet NSI Status message. This field might not be needed if the message becomes a distribution message.

2) NSI_INFO_INDEX: Binary representation of the index of the message in the overall amount of messages. This field might not be needed if the message becomes a distribution message.

3) NSI_INFO_COUNT: Information concerning how many instances of the message the MS can expect to receive from the network.

4) START_NLIST_INDEX: This field is used in order for the MS to identify at which entry of the indicated requested neighbour ARFCN list in Packet NSI Status message the parameters belongs to. This value assures that also a partly received full set of Packet NSI Information Data messages can be used. The field is not needed in the first message if the parameters belong to the first requested ARFCN. This field might be substituted with ARFCN+BSIC in case the message becomes a distribution message.

The concept of the message is so that the network uses the received ARFCN list as reference when sending the information back to the MS in the Packet NSI Information Data message. This means that the first message, if the first parameters point to the first indicated cell in the list of Requested Neighbour ARFCN list, will not contain a Start_nlist_index, and the first set of parameters is to be assigned to the first cell identified in the Requested Neighbour ARFCN List sent in the Packet NSI Status message. In the second Packet NSI Information Data reply message to the MS (if needed) will include the Start_nlist_index. The index will point to the entry in the list of Requested Neighbour ARFCN List to which the first set of parameters in that message is to be assigned to.

In case the message becomes a distribution message the same rule as above apply except the index pointer is substituted with ARFCN+BSIC or by explicit referrals to the GSM Neighbour Cell list indices. The specific encoding of the message is to be further defined. Also, the request information embedded in another message (e.g. for MBMS in PACKET DOWNLINK ACK/NACK or, if required, in another message created for MBMS uplink feedback).

In case the network does support the transmission of neighbour cell system information messages as distribution messages (as explained above), these messages could also be used by the network as standard distribution messages send when needed/distributed automatically to MSs in active transfer or involved in (a) MBMS session(s). This can be used connection with this invention in its third form.

In case the network does not reply to the Packet NSI Status message after certain time (procedure timer to protect the procedure is to be defined), the MS will stop the Packet NSI Status procedure and start normal autonomous reception of neighbour cell parameters affecting cell reselection.

The support of Packet NSI Status procedure could be indicated in e.g. the existing System Information Type 13 or Packet System Information Type 13. This could e.g. be done by adding this indication after the Release R4 additions. 1 bit for indicating the support is enough.

Figure 5:
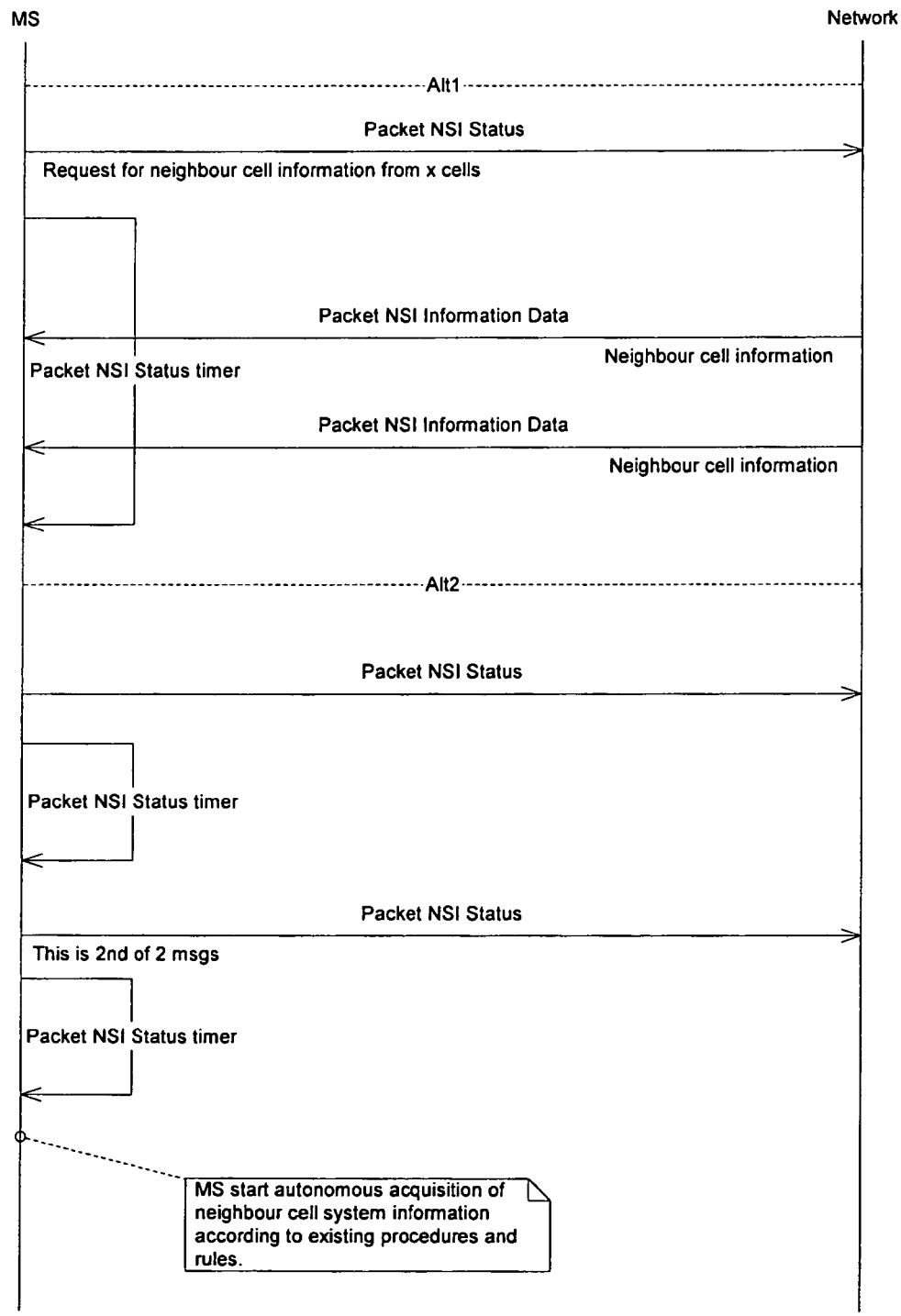
FIG. 5 shows a further detailed variant of a method in accordance of the second embodiment or in accordance with a combination of the first and second embodiments.

The above procedure is illustrated in FIG. 5.

Generally the indication of the support of the feature (whether it is the option where Packet SI Status procedure is re-used or the proposed Packet NSI Status procedure) may be indicated from network side in SI13/PSI13. The could be done as follows:

The SI 13 Rest Octets information element is coded according to the syntax specified below and described in tables 10.5.2.37b.1/3GPP TS 44.018 and 10.5.2.37b.2/3GPP TS 44.018.

The SI 13 Rest Octets information element is a type 5 information elements with 20 octets length.

TABLE 10.5.2.37b.1

3GPP TS 44.018: SI 13 Rest Octets information element content

```
< SI 13 Rest Octets > ::=
    { L | H
      < BCCH_CHANGE_MARK : bit (3) >
      < SI_CHANGE_FIELD : bit (4) >
      { 0 | 1 < SI13_CHANGE_MARK : bit (2) >
            < GPRS Mobile Allocation : GPRS Mobile Allocation IE > } --  Defined   in
3GPP TS 44.060
        { 0
                                          -- PBCCH not present in cell:
            < RAC : bit (8) >
            < SPGC_CCCH_SUP : bit >
            < PRIORITY_ACCESS_THR : bit (3) >
            < NETWORK_CONTROL_ORDER : bit (2) >
            < GPRS Cell Options : GPRS Cell Options IE >        --  Defined   in
3GPP TS 44.060
            < GPRS Power Control Parameters: GPRS Power Control Parameters struct >
        | 1           -- PBCCH present in cell:
            < PSI1_REPEAT_PERIOD : bit (4) >
            < PBCCH Description : PBCCH Description struct >
        }
        { null | L            -- Receiver compatible with earlier release
        | H            -- Additions in release 99 :
            < SGSNR : bit >
        { null | L            -- Receiver compatible with earlier release
        | H            -- Additions in release R4°:
            < SI_STATUS_IND°: bit >
        { null | L            -- Receiver compatible with earlier release
        | H            -- Additions in release Rx°:
            < Packet_NSI_STATUS°: bit > } }
    }
    < spare padding > ;
< GPRS Power Control Parameters struct > ::=
    < ALPHA : bit (4) >
    < T_AVG_W : bit (5) >
    < T_AVG_T : bit (5) >
    < PC_MEAS_CHAN : bit >
    < N_AVG_I : bit (4) >;
< PBCCH Description struct > ::=
    <Pb : bit (4)
    < TSC : bit (3) >
    < TN : bit (3) >
    { 00    -- BCCH carrier
    | 01    < ARFCN : bit (10) >
    | 1            < MAIO : bit (6) >} ;
```

Where the Packet_NSI_STATUS bit added in the end of the message indicates that the network supports the usage of the Packet NSI Status procedure. If the re-use of Packet SI Status procedure approach is chosen this could be indicated by substituting the above added bit indicator with e.g. SI2n/SI10 support indication (SI_2n_support).

Figure 6:
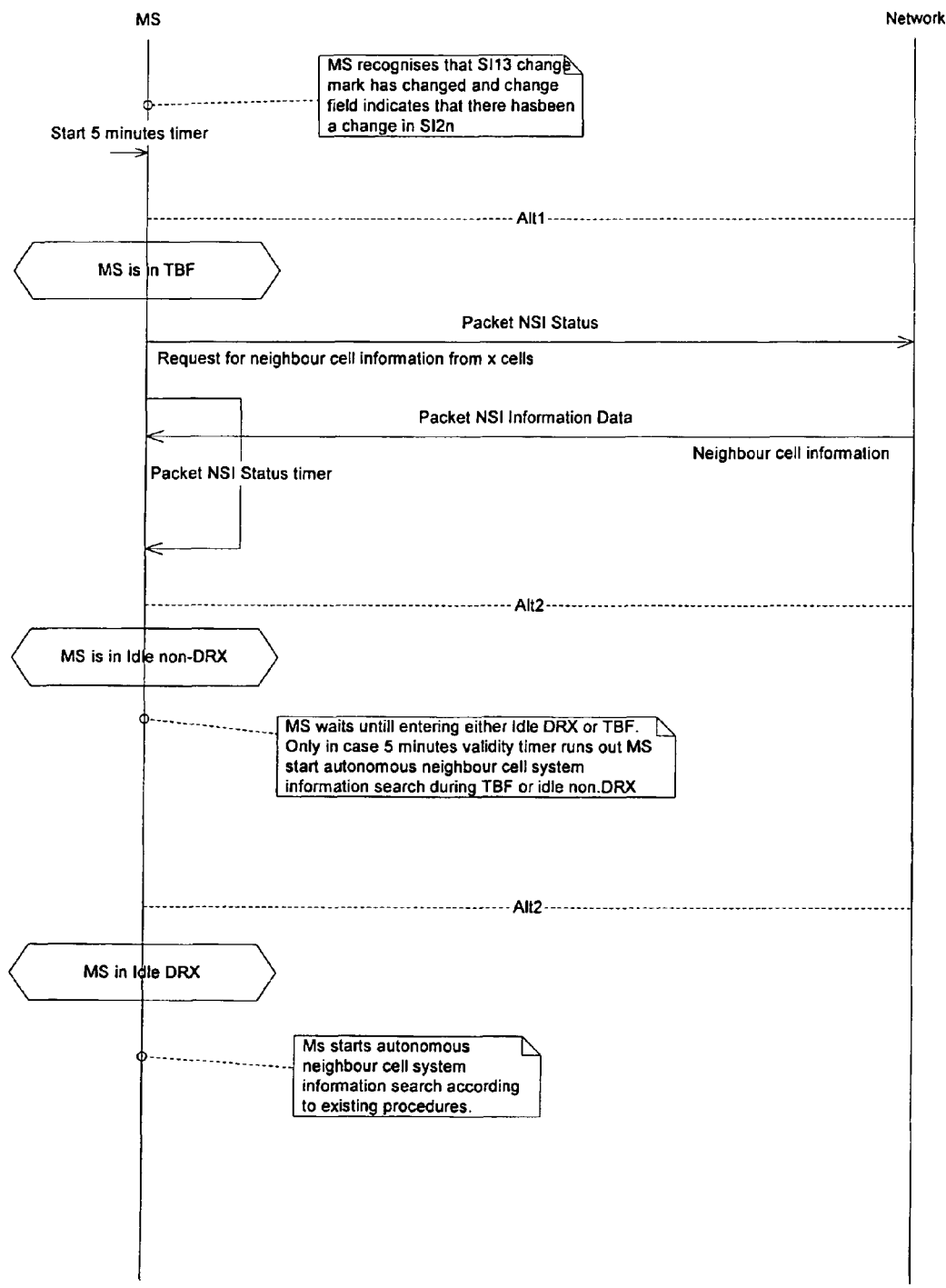
FIG. 6 shows possible further details of the method shown in FIG. 5.

As mentioned above, it is possible to provide the indication from the network to the MS so that the MS shall perform a re-acquisition of the neighbour cell parameters affecting the cell reselection. This part is applicable to both above described approaches (that is, to the Packet SI Status procedure and to the Packet NSI status procedure), and FIG. 6 shows it combined with the Packet NSI Status procedure.

This forced re-acquisition can be implemented using the already existing change mark procedures in (P)SI13. This is illustrated below in the description from SI13:

TABLE 10.5.2.37b.2

3GPP TS 04.18: SI 13 Rest Octets information element

BCCH_CHANGE_MARK (3 bit field)
This field indicates the status of the information on BCCH. The value of this field may be changed when information on BCCH is changed, see 3GPP TS 04.60.
SI_CHANGE_FIELD (4 bit field)
This field is the binary representation of which information was changed at the last indication in BCCH_CHANGE_MARK, see 3GPP TS 04.60. Range 0 to 15:
    0    Update of unspecified SI message or SI messages;
    1    Update of SI1 message;
    2    Update of SI2, SI2 bis or SI2 ter message or any instance of SI2quater messages;
    3    Update of SI3, SI4, SI7 or SI8 message;
    4    Update of SI9 message;
    5    Update of SI18 or SI20 message;
    6    Update of SI19 message;
    7    Update of SI2n/SI10 message (Update of Packet NSI Information Data) message;
All other values shall be interpreted as 'update of unknown SI message type'.

Because it is stated that all other values shall be interpreted as 'update of unknown SI message type', which according to 3GPP TSG 44.060 section 5.5.1.3.1 means that the MS is not required to update any BCCH information, it is possible to add BCCH_CHANGE_MARK value 7 indicating:

1) Update of SI2n/SI10 or
2) Update of Packet NSI Information Data

Depending on the case, the MS would hereafter start a timer. The network then has the length of the timer to start the transmission or distribution of the needed information. If the timer runs out and the MS has not received any message concerning neighbour cell system information the MS will autonomously start the reception.

Following will list the advantages and disadvantages of each of the two described procedures above. The main advantage of both procedures described above is that it makes it possible to remove the need for the MS to interrupt reception (TBF or non-DRX) in order to retrieve neighbor cell system information parameters affecting cell reselection.

First the procedure which re-uses the Packet SI Status procedure. It has at least the following advantages. This procedure re-uses already existing procedure and is as such a smaller change to the specification and the behavior of the MS. The additions proposed are not too complex and as such quite simple to implement in both network and MS. The procedure is simpler than the Packet NSI Status procedure. There is the possible re-use of SI10 message. A disadvantage is that by using the existing procedure it is not possible to make it as efficient as the second proposal. Furthermore, the network has to send information about all neighbors every time MS uses the invention in the Packet SI Status procedure.

Secondly the advantages and disadvantages of the Packet NSI Status procedure. An advantage is that the method is efficient in its usage of air interface. In addition, only neighbors for whom the MS really needs information is signalled (meaning already available information received in the former cell need not be transmitted). Also, this procedure in a slight modified form could also be used with MBMS. Disadvantages are that this procedure is a totally new procedure and it causes more changes to specification, MS and network. This disadvantage likely is superceded by the advantages, as it is preferred to have as similar procedures as possible between packet transfer mode and the MBMS point-to-multipoint reception scenarios.

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method, comprising:
determining, for a transceiver device of a communication system, mobility control information of a plurality of other transceivers, wherein the mobility control information of the plurality of other transceivers comprises transceiver-specific parameters relating to a selection of the plurality of other transceivers for communications;
causing an indication of support for requesting the mobility control information of the plurality of other transceivers to be broadcasted as part of a system information broadcast;
causing system information to be broadcasted from the transceiver on a basic broadcast control channel for receipt by a plurality of mobile communications devices, wherein the system information comprises the mobility control information of the plurality of other transceivers and wherein the mobility control information of the plurality of other transceivers is provided as a system information message of a specific type; and
providing within the system information a change indication specifying that a change has occurred to the mobility control information of the plurality of other transceivers;
wherein causing the system information to be broadcasted causes updating of the mobility control information stored in at least one of the plurality of mobile communications devices in response to detecting whether a change has occurred to the mobility control information from the change indication.

2. The method as defined in claim 1,
wherein the specific type refers to the same plurality of other transceivers as at least one other system information message type broadcast from the transceiver.

3. The method as defined in claim 1, comprising:
receiving from at least one mobile communications device a request for the mobility control information of at least one of the plurality of other transceivers; and
causing a sending, in response to the request, of the mobility control information of the at least one of the plurality of other transceivers to the at least one mobile communications device.

4. The method as defined in claim 3, wherein the request comprises a message of a procedure for requesting system information.

5. The method as defined in claim 4, wherein the procedure comprises a packet system information status procedure.

6. The method as defined in claim 4, wherein the procedure comprises a packet neighbor system information status procedure.

7. The method as defined in claim 1, wherein the transceiver represents a cell of a cellular communication system.

8. A non-transitory computer readable medium having computer program instructions stored thereon, the computer program instructions being configured to cause, upon execution, an apparatus to perform:
determining, for a transceiver of a communication system, mobility control information of a plurality of other transceivers, wherein the mobility control information of the plurality of other transceivers comprises transceiver-specific parameters relating to a selection of the plurality of other transceivers for communications;
causing an indication of support for requesting the mobility control information of the plurality of other transceivers to be broadcasted as part of a system information broadcast;
causing system information to be broadcasted from the transceiver on a basic broadcast control channel for receipt by a plurality of mobile communications devices, wherein the system information comprises the mobility control information of the plurality of other transceivers and wherein the mobility control information of the plurality of other transceivers is provided as a system information message of a specific type; and
providing within the system information a change indication specifying that a change has occurred to the mobility control information of the plurality of other transceivers; wherein causing the system information to be broadcasted causes updating of the mobility control information stored in at least one of the plurality of mobile communications devices in response to detecting whether a change has occurred to the mobility control information from the change indication.

9. A method, comprising:
receiving, via a system information broadcast, an indication of support for requesting mobility control information of a plurality of other transceivers;
receiving, at a mobile communications device, system information on a basic broadcast control channel of at least one transceiver, the system information comprising the mobility control information of the plurality of other transceivers and a change indication specifying whether a change has occurred to the mobility control information, wherein the mobility control information of the plurality of other transceivers comprises transceiver-specific parameters relating to a selection of the plurality of other transceivers for communications and wherein the mobility control information of the plurality of other transceivers is provided as a system information message of a specific type; and
causing mobility control information stored in the mobile communications device to be updated in response to detecting a change in the mobility control information from the change indication.

10. The method as defined in claim 9, further comprising:
causing, in response to receipt of the indication, mobility control information of the plurality of other transceivers to be requested from the at least one first transceiver, when the communications device is in a packet transfer mode when receiving the indication.

11. The method as defined in claim 10, further comprising:
receiving the mobility control information of the plurality of other transceivers from the at least one first transceiver.

12. The method as defined in claim 10, further comprising:
causing the mobility control information of the plurality of other transceivers to be retrieved from the plurality of other transceivers after a predefined time period lapses after the requesting without receiving the mobility control information of the plurality of other transceivers from the at least one first transceiver.

13. The method as defined in claim 9, further comprising:
causing the mobility control information of the plurality of other transceivers to be retrieved from the plurality of other transceivers, when the mobile communications device is in a packet idle mode with discontinuous reception when receiving the indication.

14. The method as defined in claim 9, further comprising:
waiting for the mobile communications device to enter a packet transfer mode before requesting the mobility control information of the plurality of other transceivers from the at least one first transceiver, when the communications device is in a packet idle mode with continuous reception when receiving the indication.

15. The method as defined in claim 9, further comprising:
waiting for the mobile communications device to enter a packet idle mode with discontinuous reception before retrieving the mobility control information of the plurality of other transceivers from the plurality of other transceivers, when the communications device is in a packet idle mode with continuous reception when receiving the indication.

16. The method as defined in claim 9, further comprising:
initiating an update of system information either in response to a predefined time from an earlier system information update having lapsed or in response to receipt of the indication.

17. The method as defined in claim 9, wherein the at least first transceiver represents a cell of a cellular communication system.

18. A non-transitory computer readable medium having computer program instructions stored thereon, the computer program instructions being configured to cause, upon execution, an apparatus to perform:
receiving, via a system information broadcast, an indication of support for requesting mobility control information of a plurality of other transceivers;
receiving system information via a basic broadcast control channel of at least one transceiver, the system information comprising the mobility control information of the plurality of other transceivers and a change indication specifying whether a change has occurred to the mobility control information, wherein the mobility control information of the plurality of other transceivers comprises transceiver-specific parameters relating to a selection of the plurality of other transceivers for communications and wherein the mobility control information of the plurality of other transceivers is provided as a system information message of a specific type; and
causing mobility control information stored in the mobile communications device to be updated in response to detecting a change in the mobility control information from the change indication.

19. An apparatus, comprising:
means for receiving, via a system information broadcast, an indication of support for requesting mobility control information of a plurality of other transceivers;
means for receiving system information via a basic broadcast control channel in at least one transceiver, the system information comprising the mobility control information of the plurality of other transceivers and a change indication specifying whether a change has occurred to the mobility control information, wherein the mobility control information of the plurality of other transceivers comprises transceiver-specific parameters relating to a selection of the plurality of other transceivers for communications and wherein the mobility control information of the plurality of other transceivers is provided as a system information message of a specific type; and
means for causing mobility control information stored in a mobile communications device to be updated in response to detecting a change in the mobility control information from the change indication.

20. An apparatus, comprising a non-transitory computer readable medium including program instructions and a processor, the computer readable medium and the program instructions configured to, with the processor, direct the apparatus at least to:
receive, via a system information broadcast, an indication of support for requesting mobility control information of a plurality of other transceivers;
receive system information on a basic broadcast control channel of at least one transceiver, the system information comprising the mobility control information of the plurality of other transceivers and a change indication specifying whether a change has occurred to the mobility control information, wherein the mobility control information of the plurality of other transceivers comprises transceiver-specific parameters relating to a selection of the plurality of other transceivers for communications and wherein the mobility control information of the plurality of other transceivers is provided as a system information message of a specific type; and
cause mobility control information stored in a mobile communications device to be updated in response to detecting a change in the mobility control information from the change indication.

21. The apparatus as defined in claim 20, wherein the apparatus is further directed to:
cause the mobility control information of at least one of the plurality of other transceivers to be requested from the at least one transceiver.

22. A system, comprising:
means for causing information transmission to be provided between the system and mobile communications devices;
determining means for determining, for a transceiver, communication system mobility control information of a plurality of other transceivers, wherein the mobility control information of the plurality of other transceivers comprises transceiver-specific parameters relating to a selection of the plurality of other transceivers for communications;
means for causing an indication of support for requesting the mobility control information of the plurality of other transceivers to be broadcasted as part of a system information broadcast;
means for causing broadcasting of system information from the transceiver on a basic broadcast control channel for receipt by a plurality of mobile communications devices, wherein the system information comprises the mobility control information of the plurality of other transceivers and further comprises a change indication specifying whether a change has occurred to the mobility control information and wherein the mobility control information of the plurality of other transceivers is provided as a system information message of a specific type;
means for receiving system information on a basic broadcast control channel from at least one first transceiver device, at a mobile communications device, the system information comprising the mobility control information of the plurality of other transceivers and a change indication specifying whether a change has occurred to the mobility control information; and
means for causing mobility control information stored in the mobile communications device to be updated in response to detecting a change in the mobility control information from the change indication system information broadcast on the broadcast control channel.

23. The system as defined in claim 22, further comprising:
receiving means for receiving in the transceiver from at least one mobile communications device a request for the mobility control information of at least one of the plurality of other transceivers; and
means for causing, in response to the request, the mobility control information of the at least one of the plurality of other transceivers to be sent to the at least one mobile communications device.

24. An apparatus, comprising a non-transitory computer readable medium including program instructions and a processor, the computer readable medium and the program instructions configured to, with the processor, direct the apparatus at least to:
determine, at a transceiver, mobility control information of a plurality of other transceivers, wherein the mobility control information of the plurality of other transceivers comprises transceiver-specific parameters relating to a selection of the plurality of other transceivers for communications;
cause an indication of support for requesting the mobility control information of the plurality of other transceivers to be broadcasted as part of a system information broadcast;
cause system information to be broadcasted on a basic broadcast control channel for receipt by a plurality of mobile communications devices, wherein the system information comprises the mobility control information of the plurality of other transceivers and wherein the mobility control information of the plurality of other transceivers is provided as a system information message of a specific type; and
provide within the system information a change indication specifying that a change has occurred to the mobility control information of the plurality of other transceivers;
wherein causing the system information to be broadcasted causes updating of the mobility control information stored in at least one of the plurality of mobile communications devices in response to detecting whether a change has occurred to the mobility control information from the change indication.

25. The apparatus as defined in claim 24, wherein the apparatus is further directed to:
receive from at least one mobile communications device a request for mobility control information of at least one of the plurality of other transceivers; and cause, in response to the request, the mobility control information of the at least one of the plurality of other transceivers to be sent to the at least one mobile communications device.

26. The apparatus as defined in claim 24, wherein the apparatus directed to cause the system information to be broadcasted on the basic broadcast control channel for receipt by the plurality of mobile communications devices includes being directed to cause the system information to be broadcasted on the basic broadcast control channel for receipt by the plurality of mobile communications devices, the basic broadcast control channel designated for a respective cell of the transceiver.

27. A method, comprising:
causing an indication of support for requesting mobility control information of at least one other transceiver to be broadcasted as part of a system information broadcast;
receiving, in a transceiver of a communication system, from at least one mobile communications device, a request for the mobility control information of the at least one other transceiver, the request being a message of a packet system information status procedure for requesting system information, wherein the at least one other transceiver is specified within the request; and
causing, in response to the request, the mobility control information of the at least one other transceiver to be sent to the at least one mobile communications device from the transceiver; wherein the mobility control information is configured to assist the at least one mobile communications device to move into the control of the at least one other transceiver wherein the mobility control information of the at least one other transceiver comprises transceiver-specific parameters relating to a selection of the at least one other transceiver for communications and wherein the mobility control information of the at least one other transceiver is provided as a system information message of a specific type.

28. The method as defined in claim 27, wherein the specific type refers to a same at least one other transceiver as at least one other system information message type.

29. The method as defined in claim 27, wherein the packet system information status procedure is a packet neighbor system information status procedure.

30. The method as defined in claim 27, wherein the mobility control information of the at least one other transceiver is provided as a distribution message.

31. The method as defined in claim 27, wherein the at least one other transceiver represents a cell of a cellular communication system.

32. The method as defined in claim 27, further comprising:
causing, by the mobile communications device, the mobility control information of the at least one other transceiver to be requested.

33. A non-transitory computer readable medium having computer program instructions stored thereon, the computer program instructions being configured to cause, upon execution, an apparatus to perform:
causing an indication of support for requesting mobility control information of at least one other transceiver to be broadcasted as part of a system information broadcast;
receiving, in a transceiver of a communication system, from at least one mobile communications device, a request for mobility control information of at least one other transceiver, the request being a message of a packet system information status procedure for requesting system information, wherein the at least one other transceiver is specified within the request; and
causing, in response to the request, the mobility control information of the at least one other transceiver to be sent to the at least one mobile communications device from the transceiver; wherein the mobility control information is configured to assist the at least one mobile communications device to move into the control of the at least one other transceiver, wherein the mobility control information of the at least one other transceiver comprises transceiver-specific parameters relating to a selection of the at least one other transceiver for communications and wherein the mobility control information of the at least one other transceiver is provided as a system information message of a specific type.

34. A method, comprising:
causing communication of information between a mobile communications device and a transceiver of a communication system;
receiving, as part of a system information broadcast, an indication of support for requesting mobility control information of at least one other transceiver; and
causing, at the mobile communications device, the mobility control information of the at least one other transceiver to be requested from the transceiver via a request, the request being a message of a packet system information status procedure for requesting system information, wherein the at least one other transceiver is specified within the request; wherein the mobility control information is configured to assist the mobile communications device to move into the control of the at least one other transceiver, wherein the mobility control information of the at least one other transceiver comprises transceiver-specific parameters relating to a selection of the at least one other transceiver for communications and wherein the mobility control information of the at least one other transceiver is provided as a system information message of a specific type.

35. The method as defined in claim 34, further comprising:
receiving the mobility control information of the at least one other transceiver from the transceiver.

36. The method as defined in claim 34, wherein the specific type refers to a same at least one other transceiver as at least one other system information message type.

37. The method as defined in claim 34, wherein the packet system information status procedure is a packet neighbor system information status procedure.

38. The method as defined in claim 34, wherein the mobility control information of the at least one other transceiver is provided as a distribution message.

39. The method as defined in claim 34, further comprising:
receiving an indication of a change in the mobility control information of the at least one other transceiver.

40. The method as defined in claim 34, wherein the at least one other transceiver represents a cell of a cellular communication system.

41. A non-transitory computer readable medium having computer program instructions stored thereon, the computer program instructions being configured to cause, upon execution, an apparatus to perform:
causing communication of information between a mobile communications device and a transceiver of a communication system;
receiving, as part of a system information broadcast, an indication of support for requesting mobility control information of at least one other transceiver; and
causing, at the mobile communications device, the mobility control information of the at least one other transceiver to be requested from the transceiver via a request, the request being a message of a packet system information status procedure for requesting system information, wherein the at least one other transceiver is specified within the request; wherein the mobility control information is configured to assist the mobile communications device to move into the control of the at least one other transceiver, wherein the mobility control information of the at least one other transceiver comprises transceiver-specific parameters relating to a selection of the at least one other transceiver for communications and wherein the mobility control information of the at least one other transceiver is provided as a system information message of a specific type.

42. A computer readable medium as defined in claim 41, comprising program instructions for causing an apparatus to further perform:
receiving the mobility control information of the at least one other transceiver from the transceiver.

43. An apparatus, comprising a non-transitory computer readable medium including program instructions and a processor, the computer readable medium and the program instructions configured to, with the processor, direct the apparatus at least to:
cause information to be communicated between a mobile communications device and a transceiver;
receive, as part of a system information broadcast, an indication of support for requesting mobility control information of at least one other transceiver; and
cause, at the mobile communications device, the mobility control information of the at least one other transceiver to be requested from the transceiver via a request, the request being a message of a packet system information status procedure for requesting system information, wherein the at least one other transceiver is specified within the request, wherein the transceiver and the at least one other transceiver being part of a communication system and wherein the mobility control information is configured to assist the mobile communications device to move into the control of the at least one other transceiver, wherein the mobility control information of the at least one other transceiver comprises transceiver-specific parameters relating to a selection of the at least one other transceiver for communications and wherein the mobility control information of the at least one other transceiver is provided as a system information message of a specific type.

44. A system, comprising:
a plurality of transceivers configured to provide information transmission between the system and mobile communications devices;
wherein at least one transceiver of the plurality of transceivers is configured to:
cause an indication of support for requesting mobility control information of at least one other transceiver to be broadcast as part of a system information broadcast;
receive, from at least one mobile communications device, a request for the mobility control information of the at least one other transceiver, the request being a message of a packet system information status procedure for requesting system information, wherein the at least one other transceiver is specified within the request, and
cause, in response to the request, the mobility control information of the at least one other transceiver to be sent to the at least one mobile communications device;
wherein the mobility control information is configured to assist the mobile communications device to move into the control of the at least one other transceiver,
wherein the mobility control information of the at least one other transceiver comprises transceiver-specific parameters relating to a selection of the at least one other transceiver for communications and wherein the mobility control information of the at least one other transceiver is provided as a system information message of a specific type.

45. A system, comprising:
a receiver configured to receive, at a transceiver, from at least one mobile communications device a request for mobility control information of at least one other transceiver, the request being a message of a packet system information status procedure for requesting system information, wherein the at least one other transceiver is specified within the request; and
a transmitter configured to:
broadcast an indication of support for requesting the mobility control information of at the least one other transceiver as part of a system information broadcast; and
send, from the transceiver and in response to the request, the mobility control information of the at least one other transceiver to the at least one mobile communications device; wherein the mobility control information is configured to assist the mobile communications device to move into the control of the at least one other transceiver, wherein the mobility control information of the at least one other transceiver comprises transceiver-specific parameters relating to a selection of the at least one other transceiver for communications and wherein the mobility control information of the at least one other transceiver is provided as a system information message of a specific type.

* * * * *